US012680986B2

(12) United States Patent
Yonekura

(10) Patent No.: US 12,680,986 B2
(45) Date of Patent: Jul. 14, 2026

(54) ION CHROMATOGRAPHY ANALYSIS SYSTEM

(71) Applicant: SHIMADZU CORPORATION, Kyoto (JP)

(72) Inventor: Takuya Yonekura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 354 days.

(21) Appl. No.: 18/241,090

(22) Filed: Aug. 31, 2023

(65) Prior Publication Data

US 2024/0077461 A1 Mar. 7, 2024

(30) Foreign Application Priority Data

Sep. 5, 2022 (JP) ................................ 2022-140569

(51) Int. Cl.
| | |
|---|---|
| *G01N 30/32* | (2006.01) |
| *B01D 15/14* | (2006.01) |
| *B01D 15/36* | (2006.01) |
| *G01N 30/14* | (2006.01) |
| *G01N 30/16* | (2006.01) |
| *G01N 30/64* | (2006.01) |
| *G01N 30/02* | (2006.01) |

(52) U.S. Cl.
CPC ............. *G01N 30/32* (2013.01); *B01D 15/14* (2013.01); *B01D 15/367* (2013.01); *G01N 30/14* (2013.01); *G01N 30/16* (2013.01); *G01N 30/64* (2013.01); *G01N 2030/027* (2013.01); *G01N 2030/326* (2013.01)

(58) Field of Classification Search
CPC ........ G01N 30/32; G01N 30/14; G01N 30/16; G01N 30/64; G01N 2030/027; G01N 2030/326; B01D 15/14; B01D 15/367
USPC ......................................................... 73/61.55
See application file for complete search history.

(56) References Cited

U.S. PATENT DOCUMENTS

| | | | | |
|---|---|---|---|---|
| 10,041,914 B1* | 8/2018 | Jingu | ...................... | G01N 30/34 |
| 2004/0131605 A1* | 7/2004 | Qin | .................... | B01D 15/3804 |
| | | | | 424/94.6 |
| 2009/0291981 A1* | 11/2009 | Schaab | ..................... | A61P 1/04 |
| | | | | 546/256 |
| 2012/0037508 A1* | 2/2012 | Shiraki | ........... | G01N 27/44713 |
| | | | | 204/453 |
| 2019/0381129 A1* | 12/2019 | Grossi | ...................... | C07K 7/08 |
| 2020/0038516 A1* | 2/2020 | Grossi | .................... | A61K 47/60 |
| 2020/0282012 A1* | 9/2020 | Francois | ................. | A61P 37/06 |
| 2020/0316163 A1* | 10/2020 | Grossi | ................ | A61K 39/3955 |

(Continued)

FOREIGN PATENT DOCUMENTS

WO 2020194609 A1 10/2020

*Primary Examiner* — Peter J Macchiarolo
*Assistant Examiner* — Rodney T Frank
(74) *Attorney, Agent, or Firm* — Renner, Otto, Boisselle & Sklar, LLP

(57) ABSTRACT

An ion chromatography analysis system includes a system monitoring part being configured to detect an abnormality, to determine, based on a fluctuation rate in a certain time of the predetermined state of a most recent of the monitor value, whether the fluctuation is a short-term fluctuation that occurs in a short term or a long-term fluctuation that occurs in a long term, and to identify a cause of the abnormality by using whether the fluctuation is the short-term fluctuation or the long-term fluctuation.

4 Claims, 2 Drawing Sheets

(56)  References Cited

U.S. PATENT DOCUMENTS

| | | | |
|---|---|---|---|
| 2022/0187254 A1* | 6/2022 | Sakamoto | .............. G01N 30/02 |
| 2024/0077461 A1* | 3/2024 | Yonekura | .............. G01N 30/14 |

* cited by examiner

ION CHROMATOGRAPHY ANALYSIS SYSTEM

BACKGROUND OF THE INVENTION

1. Field of the Invention

The present invention relates to an ion chromatography analysis system.

2. Description of the Related Art

In the ion chromatography analysis, an analysis target sample is introduced into a separation column together with an eluent to separate ion components in the sample from one another, and the electrical conductivity of the eluent eluted from the separation column is measured by a detector downstream of the separation column to create a chromatogram. When unnecessary ion components are contained in the eluent, the background (also called base ground) of the electrical conductivity of the eluent measured by the detector increases, and the detection sensitivity decreases. Therefore, a suppressor for removing unnecessary ion components in the eluent eluted from the separation column and exchanging them with hydrogen ions or the like is often provided between the separation column and the detector (see WO 2020/194609 A). When unnecessary ion components in the eluent eluted from the separation column are exchanged with hydrogen ions or the like by the suppressor, the electrical conductivity of the eluent introduced into the detector is lowered, the background of a detector signal is lowered, and highly sensitive ion analysis becomes possible.

SUMMARY OF THE INVENTION

In the ion chromatography analysis, an abnormality in which a base ground value of measurement data fluctuates sometimes occurs. When such abnormality occurs, there is a possibility that ion exchange in the suppressor is not performed normally, and analysis cannot be performed normally. Abnormalities such as fluctuation in the base ground value of measurement data are likely to be caused by lifetime due to aged deterioration of the suppressor, internal contamination of the suppressor, a wrong eluent to be fed, and a failure in passing the liquid to the suppressor (voltage is applied in a state where no liquid is passed to the suppressor). However, when such abnormality occurs, it is difficult for the user to identify the cause of the abnormality. Therefore, it has been necessary to check various parameters, check pipes, and clean suppressors on an ad hoc basis. The present invention has been made in view of the above problems, and an object of the present invention is to detect the presence or absence of an abnormality in an ion chromatography analysis system and to easily identify the cause of the abnormality when the abnormality occurs.

An ion chromatography analysis system according to the present invention includes: a liquid feeding pump that feeds an eluent; a sample injection part that is fluidly connected downstream of the liquid feeding pump and is configured to inject a sample into the eluent fed by the liquid feeding pump; a separation column that is fluidly connected downstream of the sample injection part and is for separating ion components, included in the sample injected into the eluent by the sample injection part, from each other; a suppressor that is fluidly connected downstream of the separation column and is configured to remove predetermined ion components in the eluent by applying a suppressor voltage to a channel through which the eluent flowing out from an outlet of the separation column flows; a detector that is fluidly connected to an outlet of the suppressor and measures electrical conductivity of the eluent flowing out from the suppressor; and a system monitoring part configured to monitor a monitor value including a base ground value of a measurement value of the detector and the suppressor voltage, and to determine, at a predetermined timing in a predetermined state where an eluent has been fed by the liquid feeding pump, whether or not a fluctuation of the monitor value in the predetermined state from a past occurs, when determine that the fluctuation occurs, the system monitoring part being configured to detect an abnormality, to determine, based on a fluctuation rate of a most recent of the monitor value, whether the fluctuation is a short-term fluctuation that occurs in a short term or a long-term fluctuation that occurs in a long term, and to identify a cause of the abnormality by using whether the fluctuation is the short-term fluctuation or the long-term fluctuation.

Since the ion chromatography analysis system according to the present invention includes the system monitoring part that not only monitors the base ground value of a measurement value of the detector and the suppressor voltage as monitor values, and detects an abnormality depending on whether or not there is a fluctuation in the monitor value from a predetermined state of the past at a predetermined timing in the predetermined state, but also automatically breaks down a cause of the abnormality by using whether the fluctuation in the monitor value is a short-term fluctuation or a long-term fluctuation, the ion chromatography analysis system can easily identify the cause of an abnormality when the system has one.

DETAILED DESCRIPTION OF THE INVENTION

Figure 1:
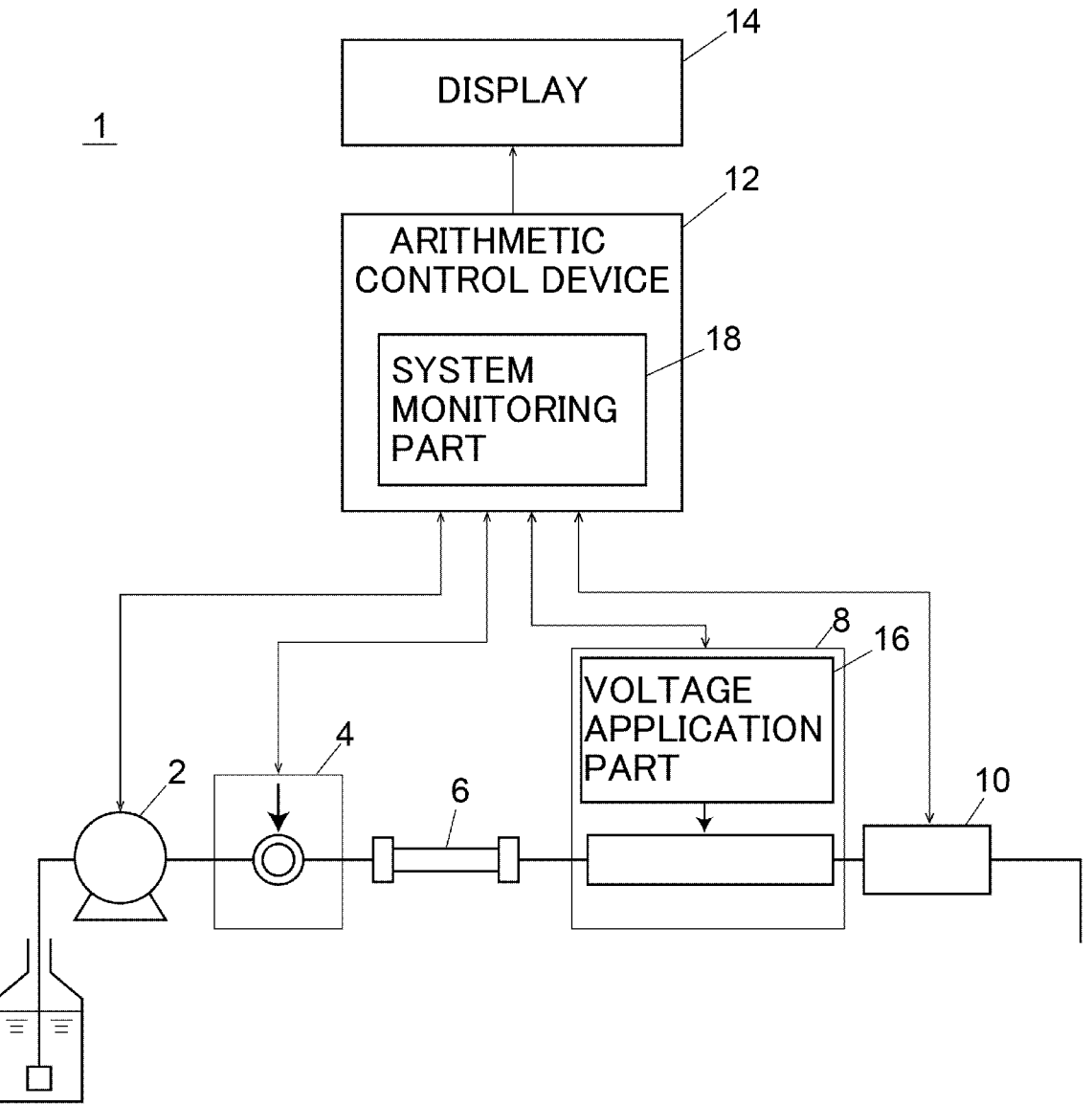
FIG. 1 is a schematic configuration diagram showing an example of an ion chromatography analysis system.

Hereinafter, an example of the ion chromatography analysis system according to the present invention will be described with reference to the drawings.

An ion chromatography analysis system 1 includes a liquid feeding pump 2, an autosampler 4, a separation column 6, a suppressor 8, a detector 10, an arithmetic control device 12, and a display 14.

The liquid feeding pump 2 is for feeding an eluent.

The autosampler 4 is fluidly connected downstream of the liquid feeding pump 2, and injects a sample into an eluent to be fed by the liquid feeding pump 2.

The suppressor 8 is fluidly connected downstream of the separation column 6, and is for reducing the electrical conductivity of the eluent by removing a predetermined ion component in the eluent. The suppressor 8 is provided with a voltage application part 16 for applying a suppressor voltage to a channel through which the eluent flowing out from an outlet of the separation column 6 flows. The voltage application part 16 performs constant current control on the suppressor voltage so that the electrical conductivity of the eluent flowing in the channel becomes constant.

The detector 10 is fluidly connected downstream of the suppressor 8, and is for measuring the electrical conductivity of the eluent having passed through the suppressor 8.

The arithmetic control device 12 is for managing the operation of the ion chromatography analysis system 1, and is implemented by a computer device such as a personal computer including a central processing part (CPU) and a data storage memory. The display 14 is connected communicably to the arithmetic control device 12.

The arithmetic control device 12 includes a system monitoring part 18. The system monitoring part 18 is a function implemented by software stored in the arithmetic control device 12. The system monitoring part 18 monitors the suppressor voltage of the suppressor 8 and the base ground value (hereinafter, BG value) of a measurement value of the electrical conductivity measured by the detector 10 each as a monitor value, and records them into the data storage memory of the arithmetic control device 12 in a frequency distribution format or the like. Then, the system monitoring part 18 determines whether or not an abnormality has occurred in the system 1 depending on whether or not the monitor value in a predetermined state fluctuates from the normal time, and when the abnormality has occurred, identifies the cause of the abnormality that has occurred based on the magnitude of the fluctuation in the monitor value and/or the magnitude of the fluctuation rate.

Figure 2:
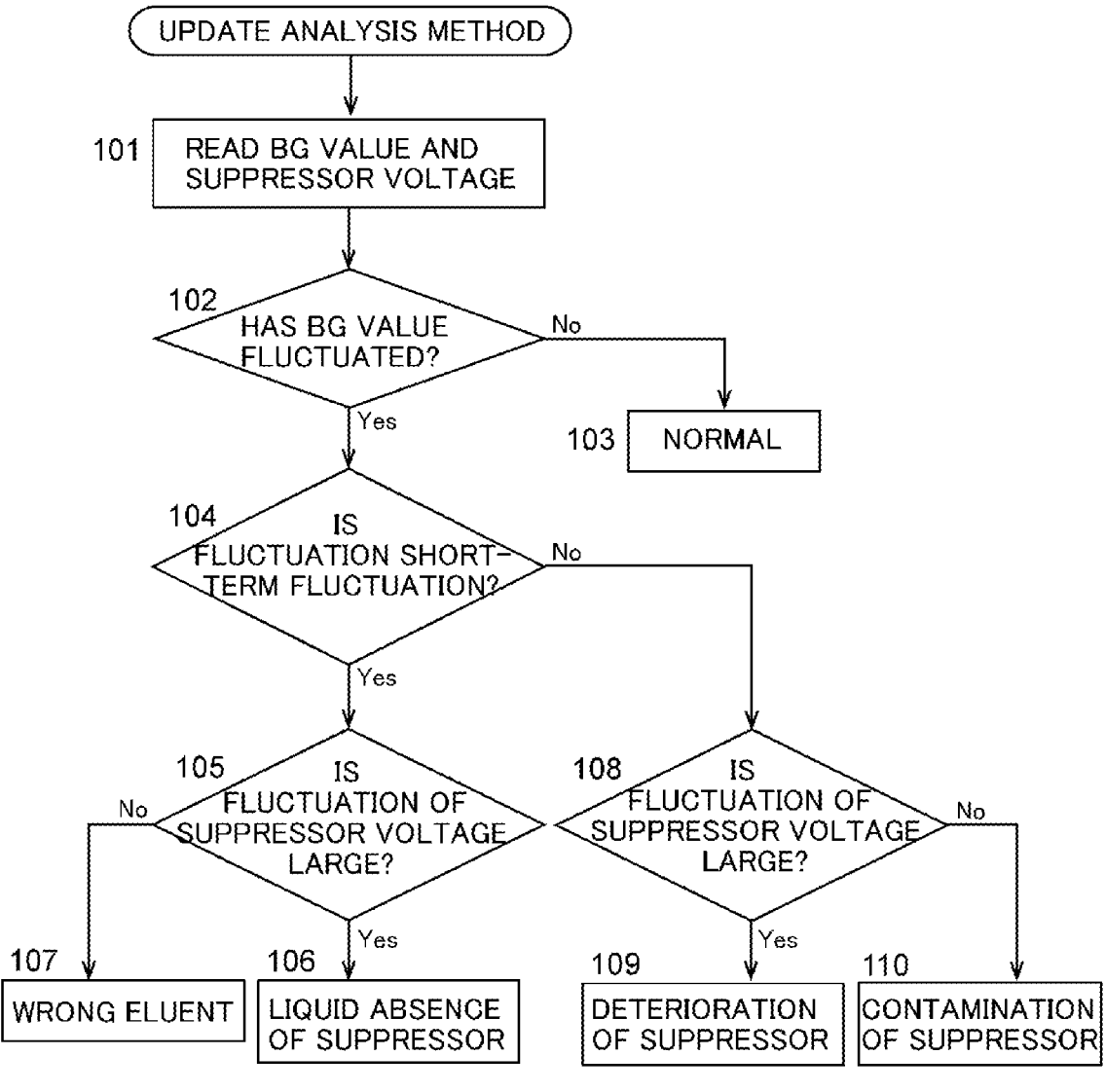
FIG. 2 is a flowchart showing an example of a system monitoring operation in the example.

An example of a system monitoring operation by the system monitoring part 18 will be described with reference to the flowchart of FIG. 2 together with FIG. 1.

The system monitoring part 18 executes the system monitoring operation described below at a predetermined timing when the system state is a predetermined state. Hereinafter, an example of executing the system monitoring operation at the timing when an analysis method is updated will be described. The predetermined state means a state where a predetermined eluent is stably fed at a predetermined flow rate and a state where a sample has not been injected into the eluent. The analysis method is a set of analysis conditions such as the type of the eluent to be used, the flow rate of the eluent, and the temperature of the separation column 6 (column oven). The analysis method is set for each analysis, and therefore in a continuous analysis where a plurality of analyses are continuously executed, the analysis method to be used for the next analysis is updated each time the analysis is executed once. Therefore, the system monitoring part 18 executes the system monitoring operation described below each time a certain analysis is finished and a method set for the next analysis is read.

The system monitoring part 18 reads the BG value and the suppressor voltage at the timing when the analysis method is updated and the system state becomes a standby state (step 101). The BG value and the suppressor voltage to be read are not instantaneous values but average values for a certain period (for example, 5 seconds). The system monitoring part 18 determines whether or not a fluctuation from a value in a normal time has occurred in the BG value (step 102), and determines that the system 1 has no abnormality (that is, normal) if the fluctuation from the normal value has not occurred in the BG value (step 103).

The value of the BG value in the normal time may be, for example, an average value of the BG values acquired when the system state is a predetermined state (a state where the same type of eluent as the eluent set by the current analysis method is fed at the same liquid feeding flow rate) in the past. The system monitoring part 18 sets, as, for example, BG value in the normal time ±α, a reference range serving as a reference of whether or not a fluctuation from the normal time has occurred in the BG value using the BG value in the normal time, determines that there is no fluctuation from the normal time in the BG value if the read BG value falls inside the reference range (step 102: No), and determines that the fluctuation from the normal time has occurred in the BG value if the read BG value falls outside the reference range (step 102: Yes).

When determining that the fluctuation from the normal time has occurred in the BG value, the system monitoring part 18 detects an abnormality in the system and determines whether the fluctuation is a short-term fluctuation or a long-term fluctuation (step 104). The short-term fluctuation of the BG value means that the BG value rapidly fluctuates in a short period of time, and the long-term fluctuation of the BG value means that the BG value gradually fluctuates over a long period of time. Whether the fluctuation in the BG value is a short-term fluctuation or a long-term fluctuation can be determined based on a fluctuation rate (change amount/time) of the BG value in a most recent certain period of time (for example, 300 seconds) when the system state is a predetermined state. When determining that the BG value fluctuates from the value in the normal time, the system monitoring part 18 calculates the fluctuation rate of the BG value in the most recent certain period of time, determines the short-term fluctuation if the calculated fluctuation rate falls outside a predetermined range (step 104: Yes), and determines the long-term fluctuation if the fluctuation rate falls inside the predetermined range (step 104: No).

Possible causes of the short-term fluctuation of the BG value include liquid absence of the suppressor 8 and a wrong eluent. The liquid absence of the suppressor 8 means that the eluent does not flow through the suppressor 8 (failure in passing the liquid to the suppressor 8) for some reason such as erroneous piping, and the eluent is introduced into the detector 10 without passing through the suppressor 8, or the eluent is not introduced into the suppressor 8 and the detector 10. In this case, since the eluent flowing through the detector 10 does not pass through the suppressor 8 or the eluent is not introduced into the detector 10, the electrical conductivity of the eluent measured by the detector 10 greatly changes before and after the liquid absence of the suppressor, and the fluctuation rate of the most recent BG value increases. At this time, since the suppressor 8 is applied with the suppressor voltage in a state where the eluent does not flow, the suppressor voltage also greatly increases. On the other hand, "wrong eluent" means that the type of the eluent fed by the liquid feeding pump 2 is different from the eluent set by the analysis method. In this case, since the type and/or amount of the ion component contained in the eluent currently fed is different from that of the eluent set by the current analysis method, the electrical conductivity of the eluent flowing through the detector 10 rapidly changes from the most recent value. Also in this case, the suppressor voltage of the suppressor 8 can change from the normal time, but the change amount is smaller than that in the case of "liquid absence of the suppressor 8".

The system monitoring part 18 sets, as (the average value of) the suppressor voltage ±β, in the normal time, a reference range for determining whether or not the fluctuation of the suppressor voltage is large, and determines whether or not the fluctuation of the suppressor voltage from the normal time is large depending on whether or not the suppressor voltage is within the reference range when the short-term fluctuation of the BG value is detected (step 105). Then, when the fluctuation of the suppressor voltage from the normal time is large (step 105: Yes), the system monitoring part 18 determines that the cause of the abnormality is "liquid absence of the suppressor 8" (step 106), and when the fluctuation of the suppressor voltage from the normal time is small (step 105: No), the system monitoring part 18 determines that the cause of the abnormality is "wrong eluent" (step 107). When the liquid absence of the suppressor 8 occurs, the short-term fluctuation rate of the suppressor voltage is overwhelmingly larger than that when the wrong eluent occurs. Therefore, the cause of the abnormality may be broken down using the magnitude of the most recent fluctuation rate of the suppressor voltage in place of the magnitude of the fluctuation of the suppressor voltage.

Examples of the cause of long-term fluctuation of the BG value include deterioration of the suppressor 8 and internal contamination of the suppressor 8. When the suppressor 8 is deteriorated, the ability to remove unnecessary ion components from the eluent is reduced, and the electrical conductivity of the eluent having passed through the suppressor 8 becomes higher than that in the normal time. When the suppressor 8 is deteriorated, a high suppressor voltage is required in order to remove unnecessary ion components from the eluent, and therefore the suppressor voltage also becomes higher than that in the normal time. On the other hand, when the internal contamination of the suppressor 8 occurs, the electrical conductivity of the eluent having passed through the suppressor 8 becomes higher than that in the normal time due to the ion component accumulated in the suppressor 8, meanwhile the fluctuation of the suppressor voltage from the normal time is not large as compared with that in the case where the suppressor 8 is deteriorated.

The system monitoring part 18 sets a reference range for determining whether or not the fluctuation of the suppressor voltage from the normal time is large, and determines whether or not the fluctuation of the suppressor voltage from the normal time is large depending on whether or not the suppressor voltage is within the reference range when a long-term fluctuation of the BG value is detected (step 108). Then, when the fluctuation of the suppressor voltage from the normal time is large (step 108: Yes), the system monitoring part 18 determines that the cause of the abnormality is "deterioration of the suppressor 8" (step 109), and when the fluctuation of the suppressor voltage from the normal time is small (step 108: No), the system monitoring part 18 determines that the cause of the abnormality is "contamination of the suppressor 8" (step 110).

When detecting an abnormality of the system by the fluctuation of the BG value and identifying the cause of the abnormality, the system monitoring part 18 notifies the user of the identified cause by displaying the identified cause on the display 14 or the like. Due to this, the user does not need to execute work for resolving the abnormality on an ad hoc basis, and the work load on the user at the time of occurrence of the abnormality is reduced.

The example described above is merely an example of an embodiment of the ion chromatography analysis system according to the present invention. The embodiment of the ion chromatography analysis system according to the present invention is as follows.

An embodiment of an ion chromatography analysis system according to the present invention includes: a liquid feeding pump that feeds an eluent; a sample injection part that is fluidly connected downstream of the liquid feeding pump and is configured to inject the sample into the eluent fed by the liquid feeding pump; a separation column that is fluidly connected downstream of the sample injection part and is for separating ion components, included in the sample injected into the eluent by the sample injection part, from each other; a suppressor that is fluidly connected downstream of the separation column and is configured to remove predetermined ion components in the eluent by applying a suppressor voltage to a channel through which the eluent flowing out from an outlet of the separation column flows; a detector that is fluidly connected to an outlet of the suppressor and measures electrical conductivity of the eluent flowing out from the suppressor; and a system monitoring part configured to monitor a monitor value including a base ground value of a measurement value of the detector and the suppressor voltage each, and to determine, at a predetermined timing in a predetermined state where an eluent has been fed by the liquid feeding pump, whether or not a fluctuation of the monitor value in the a predetermined state from a past occurs, when determine that the fluctuation occurs, the system monitoring part being configured to detect an abnormality, to determine, based on a fluctuation rate in a certain time of the predetermined state of a most recent of the monitor value, whether the fluctuation is a short-term fluctuation that occurs in a short term or a long-term fluctuation that occurs in a long term, and to identify a cause of the abnormality by using whether the fluctuation is the short-term fluctuation or the long-term fluctuation.

In an aspect [1] of the embodiment described above, the system monitoring part is configured to set a first reference range for the base ground value and a second reference range for the suppressor voltage based on the base ground value and the suppressor voltage when the ion chromatography analysis system is normal, to determine that the fluctuation of the base ground value occurs based on that the base ground value falls outside the first reference range, and to determine that the fluctuation of the suppressor voltage based on that the suppressor voltage falls outside the second reference range.

In an aspect [2] of the embodiment described above,
the system monitoring part
  is configured to detect the abnormality when determining that the fluctuation occurs in the base ground value,
  is configured, when the fluctuation of the base ground value is the long-term fluctuation, to identify, as a cause of the abnormality, any one of deterioration of the suppressor and internal contamination of the suppressor depending on a magnitude of the fluctuation of the suppressor voltage or a magnitude of the fluctuation rate, and
  is configured, when the fluctuation of the base ground value is the short-term fluctuation, to identify, as a cause of the abnormality, any one of a liquid passing failure to the suppressor and a wrong eluent depending on a magnitude of the fluctuation of the suppressor voltage or a magnitude of the fluctuation rate.

In an aspect [3] of the embodiment described above, the system monitoring part is configured to determine that the fluctuation of the base ground value is the long-term fluctuation when the fluctuation rate of a most recent of the base ground value falls inside a first range, determine that the fluctuation of the base ground value is the short-term fluctuation when the fluctuation rate of a most recent of the base ground value falls inside a second range, and the first predetermined range is configured to become smaller than the second predetermined range.

In an aspect [4] of the embodiment described above, the system monitoring part is configured to notify a user of the cause having been identified when detecting the abnormality and identifying a cause of the abnormality.

DESCRIPTION OF REFERENCE SIGNS

1 ion chromatography analysis system
2 liquid feeding pump 4 autosampler
6 separation column
8 suppressor
10 detector
12 arithmetic control device
14 display
16 voltage application part
18 system monitoring part

What is claimed is:

1. An ion chromatography analysis system comprising: a liquid feeding pump that feeds an eluent; a sample injection part that is fluidly connected downstream of the liquid feeding pump and is configured to inject a sample into the eluent fed by the liquid feeding pump; a separation column that is fluidly connected downstream of the sample injection part and is for separating ion components, included in the sample injected into the eluent by the sample injection part, from each other; a suppressor that is fluidly connected downstream of the separation column and is configured to remove predetermined ion components in the eluent by applying a suppressor voltage to a channel through which the eluent flowing out from an outlet of the separation column flows; a detector that is fluidly connected to an outlet of the suppressor and measures electrical conductivity of the eluent flowing out from the suppressor; and an arithmetic control device configured to monitor a base ground value of a measurement value of the detector and to manage a state of the ion chromatography analysis system based on the base ground value, wherein the arithmetic control device stores a first reference range set based on the base ground value at a time when an abnormality does not occurs in the ion chromatography analysis system and the state of the ion chromatography analysis system is a predetermined state where an eluent has been fed by the liquid feeding pump, and a second reference range which is a reference range of a fluctuation rate in a certain time of the base ground value, the arithmetic control device is configured to: compare, at a predetermined timing when the state of the state of the ion chromatography analysis system is the predetermined state, the base ground value with the first reference range and detect the abnormality when the base ground value falls outside the first reference range, in a case where the abnormality is detected, calculate the fluctuation rate of the base ground value in a most recent certain time when the state of the ion chromatography analysis system is the predetermined state, compare the calculated fluctuation rate with the second reference range, and perform identification of a cause of the detected abnormality based on whether the calculated fluctuation rate is in the second reference range or not.

2. The ion chromatography analysis system according to claim 1, the arithmetic control device stores a third reference range set based on the suppressor voltage at the time when the abnormality does not occurs in the ion chromatography analysis system and the state of the ion chromatography analysis system is the predetermined state, and the arithmetic control device is configured to monitor the suppressor voltage, in the case where the abnormality is detected, to execute a determination whether the suppressor voltage at the predetermined timing is in the third reference range or not, and to use a result of the determination for the identification of the cause of the abnormality.

3. The ion chromatography analysis system according to claim 2, wherein the arithmetic control device is configured, when the calculated fluctuation rate is in the second reference range, to identify, as the cause of the abnormality, any one of deterioration of the suppressor and internal contamination of the suppressor depending on whether the suppressor voltage at the predetermined timing is in the third reference range or not, and is configured, when the calculated fluctuation rate falls outside the second reference range, to identify, as a cause of the abnormality, any one of a liquid passing failure to the suppressor and a wrong eluent depending on whether the suppressor voltage at the predetermined timing is in the third reference range or not.

4. The ion chromatography analysis system according to claim 1, wherein the arithmetic control device is configured to notify a user of the cause having been identified when and identifying a cause of the abnormality.

* * * * *